2,575,895
Patented Apr. 20, 1971

3,575,895
USE OF A HYDROCARBON UREA ADDUCT IN MAKING SPONGE RUBBER
Norman C. Ross, Franklin, and Bernard K. Mueller, Bakersfield, Pa., assignors to Witco Chemical Corporation, New York, N.Y.
No Drawing. Original application Aug. 26, 1966, Ser. No. 575,250, now Patent No. 3,502,632, dated Mar. 24, 1970. Divided and this application Feb. 5, 1969, Ser. No. 823,213
Int. Cl. C08f 47/10; C08j 1/18, 1/20
U.S. Cl. 260—2.5
2 Claims

ABSTRACT OF THE DISCLOSURE

Production of sponge rubber by adding to a vulcanizable rubber compound a blowing agent and a small amount of an adduction product of urea with a stoichiometric excess of a solution containing between about 25 and 75 weight percent of n-paraffin hydrocarbon having about 17 to 30 carbon atoms in light neutral paraffinic oil, and effecting sponging of said rubber.

---

This is a division of application Ser. No. 575,250, filed Aug. 26, 1966, now U.S. Pat. No. 3,502,632.

This invention relates to new and novel vulcanizable sponge rubber formulations and more particularly to vulcanizable sponge rubber compounded with a novel class of rubber compounding materials which serve as sponge rubber blowing agents promoters and vulcanization activators, to methods of making such novel materials and to the use of them.

Rubber technologists have striven for years to reduce the time and temperature required for the vulcanization of rubber, both for the purpose of producing a better quality of rubber vulcanizate and to increase the output of the vulcanizing equipment. With these ends in view, numerous vulcanization accelerators and activators have been developed that are used to produce vulcanizates having satisfactory physical properties. Compounding for special products such as sponge rubber vulcanizates, however, presents the additional concern of blowing agent decomposition and coordinating this with the vulcanization reaction.

It has long been known that the incorporation of urea into compounded rubber stocks promotes the controlled decomposition of nitrogen-containing sponge rubber blowing agents as well as forming a powerful vulcanization accelerator combination with primary organic accelerators.

Use of urea as a compounding ingredient for rubber stocks has been limited, however, by difficulties encountered in incorporating and obtaining uniform dispersions thereof in rubber using conventional compounding equipment. Vulcanizates obtained are found to have visual defects and local variation in cure with a loss of desirable physical properties. This is especially apparent in sponge rubber vulcanizates which exhibit non-uniform pore structure and texture as well as numerous visible surface defects.

Urea and urea compounds in pellet, crystalline and finely ground forms as well as urea complexes and urea adducts have been proposed for and used as rubber compounding ingredients and some of such materials have achieved commercial acceptance. Typical of various heretofore suggested urea-containing compositions are disclosed, for instance, in U.S. Pats. Nos. 2,131,127; 2,480,814 and 2,812,373. However, all such compositions, so far as we are aware, have been deficient in one or more of such characteristics as non-caking during storage, ease of incorporation into the rubber stock using conventional rubber compounding equipment, capability of being readily and uniformly dispersed, non-blooming from the vulcanizate. Moreover, none have been found to afford the activity as a blowing agent promoter and vulcanization activator necessary to economically produce superior sponge rubber vulcanizates exhibiting uniform pore structure and texture, and having minimal surface defects.

It is an object of the present invention to provide novel, non-caking compositions which are capable of being readily and uniformly incorporated in rubber or rubber compounds without inducing appreciable vulcanizing effect at atmospheric or slightly elevated temperatures but which actively promote the controlled decomposition of sponge rubber blowing agents at customary vulcanization temperature.

It is another object of the present invention to provide methods of making novel, non-caking, compositions that are capable of being readily and uniformly incorporated into rubber or rubber compounds and that can be used as promoters for the controlled decomposition of blowing agents in sponge rubber.

It is a still further object of the present invention to provide novel rubber compositions which are capable of being vulcanized into sponge rubber vulcanizates having a uniform cell structure, and texture and visually superior surface characteristics.

It is a still further object of the present invention to provide novel rubber compositions which are capable of being vulcanized over a wide range of curing conditions into sponge rubber and other rubber vulcanizates exhibiting superior physical properties.

Other objects of the invention will be clear from the following description.

In accordance with the present invention it has been discovered that these desiderata and many other advantages and benefits are realized and achieved to a highly successful and surprising extent by vulcanizing a rubber stock in which has been incorporated, in addition to a vulcanizing agent and a sponge rubber blowing agent, certain types of urea-n-paraffin hydrocarbon adducts.

The urea-n-paraffin hydrocarbon adducts made and used pursuant to the present invention are adduction products of urea and a light paraffinic neutral oil containing paraffinic wax and are produced by reacting urea with a stoichiometric excess of the n-paraffin hydrocarbon neutral oil solution, the reaction being permitted to proceed until all the urea has been reacted.

In conducting the adduction reaction, it is important that an excess of the n-hydrocarbon paraffin oil solution be used, so that non-adducted n-paraffin hydrocarbon is present in the resulting adduct and at the same time no unreacted urea is present. In the case where no non-adducted n-paraffin hydrocarbon is present or unreacted urea remains and is not subsequently separated from the product, the desired ease of incorporation and uniform dispersibility is lost and the vulcanizates produced do not exhibit uniformity of pore structure and texture.

Crystalline complexes formed between urea or thiourea and certain organic compounds have been widely studied and are well defined. (Brooks et al., The Chemistry of Petroleum Hydrocarbons, vol. I, Reinhold, New York, 1954 pp. 241–274.)

Based on experimental results from several sources, the composition of urea adducts of normal hydrocarbons lends itself to representation by the equation (Brooks et al., supra) $m=0.65n+1.5$ where "$m$" is the mole ratio of urea to hydrocarbon and "$n$" is the number of carbon atoms in the hydrocarbon, or for more practical purposes and convenience a constant weight ratio of 3.3 grams of urea per gram of normal hydrocarbon.

U.S. Pat. 2,812,373 teaches the use of such crystalline adducts of urea with straight-chain aliphatic compounds having at least six carbon atoms as rubber compounding ingredients for assisting primary organic vulcanization accelerators in the vulcanization of sulfur-vulcanizable rubbers. The urea adducts employed by said patent are the compositions disclosed in Brooks et al. supra prepared in stoichiometric proportions.

The novel urea adducts of the present invention, as disclosed hereinafter, are distinguished from those referred to in Brooks et al. and in said patent, and exhibit surprising and unexpected characteristics not taught nor implied by Brooks et al. or by said patent. Further, the novel urea adducts of the present invention have been herein found to produce surprisingly superior sponge rubber vulcanizates over a wide range of vulcanizing conditions.

As has been noted hereinabove, the adduction products of the present invention are prepared by reacting urea and a stoichiometric excess of the n-paraffin containing oil described herein. The reactions are carried out at temperatures below the decomposition temperature of the adduct and preferably at temperatures only as high as required to insure complete dissolution of the n-paraffin containing oil.

The temperature of the reaction should not be higher than about 125° F. and especially good results are achieved when the temperature is between about 105°, better still 110° and 120° F.

In accordance with the present invention, n-paraffin hydrocarbon-neutral oil solutions containing from about 25% to 75% n-paraffin hydrocarbons having between about 17 and 30 carbon atoms may be used to produce the urea adducts of the present invention. n-Paraffin-oil solutions containing from about 40% to 60% of n-paraffin hydrocarbons having between about 18 and 23 carbon atoms are especially suitable. Solutions that may be used are the paraffin wax-containing light paraffin neutral oil refinery by-products of lubrication oil production from highly paraffinic grade petroleum stocks such as the Pennsylvania crudes. Also suitable are the paraffin wax-containing light neutral oil solutions obtained as refinery by-products derived from paraffin-rich crude petroleums including those used for the production of various grades of paraffin wax. Also suitable are solutions of wax in oil wherein paraffin wax as herein described is dissolved in wax-free light neutral oil having a viscosity at 210° F. of about 40–44 SUS, an API gravity of 43 and a minimum flash point of 300° F. or added to a wax-containing oil wherein the wax content is to be enriched. Especially suitable for use are paraffin wax-containing light neutral oils having a melting point between about 90° and 105° F.

For commercial reasons, it is desirable to produce the urea adducts of the present invention using commercial grade urea having a nitrogen content of about 46 percent and a melting point between about 268° and 272° F. It is desirable that the urea be pulverized into a relatively small particle size to provide for rapid dispersion in the wax-containing oil as well as making it readily available for reaction with the wax-oil solution.

Urea adducts of the present invention are preferably produced by adding finely ground particles of urea to a wax-containing oil batch heated to a temperature between about 105° F. and 125° F. and preferably between about 110° F. and 210 F. A suitable co-solvent for both the urea and wax-oil solution, such as methyl alcohol, is added and the mixture is stirred while being maintained at a temperature between about 105° F. and 120° F. for at least one-half hour, or between about 1 and 6 hours, during which time the adduction is carried out and the urea is completely reacted. The amount of n-paraffin hydrocarbon in the solution is in excess of that stoichiometrically required to react with the urea. The amount of excess n-paraffin hydrocarbon is preferably at least about 5 percent, and may be between about 100 and 600 percent, or higher, based on the urea. The urea adduct produced is separated from the unreacted n-paraffin wax-containing oil by centrifuging or filtration and then ground to a particle size of between about 20 and 100 mesh.

The co-solvent has an important role in the adduction reaction in that it serves to bring the urea and n-paraffin hydrocarbon into intimate contact in a homogeneous solution phase thereby promoting the adduction reaction. The type of co-solvent is one which is capable of providing a homogeneous solution of reactants and which does not inhibit the adduct formation. Co-solvents suitable for use in preparing the urea adducts of the present invention are, for instance, methyl alcohol, ethyl alcohol and iso-propyl alcohol. While not critical, it is preferable to use between about .020 gal. and .030 gal. and preferably about .025 gal. of co-solved per pound of urea.

The urea adducts of the present invention have a urea content of between about 55 and 72 percent by weight, and preferably between about 67 and 70 percent by weight, and a melting point between about 270° F. and 290° F.

The vulcanizable rubbers suitable for use in the present invention may be any natural or synthetic rubbers which are capable of vulcanization when heated with sulfur or other vulcanization agents and include latices and reclaims of such materials whether or not admixed with pigments, fillers, softeners, antioxidants, blowing agents, etc.

Specific examples embodying the teachings set forth above are here given by way of exemplification and not restriction. All parts listed are by weight unless otherwise specifically stated.

EXAMPLE 1

To 900 parts of a light neutral paraffinic oil containing 50 percent by weight paraffin wax and having an initial boiling point of 400° F. and melting point of 105° F., heated to a temperature of about 110° to 120° F., was added 300 parts of crushed urea particles and 50 parts of methyl alcohol. The mixture was continuously stirred while maintaining a temperature of about 120° F. for about 3 hours when the adduction reaction was complete and all the urea had been reacted. The slurry was then filtered over a Buchner funnel, and the urea adduct cake formed was ground to pass through a 20 mesh screen.

The urea adduct contained 60 percent urea and had a melting point of 240° F. A sample of the ground adduct was stored in a closed container for one month after which time it was found to have retained its dry, free-flowing characteristics.

Another sample of the urea adduct particles was aged for 4 hours at 200° F. after which time no bleeding or caking was observed.

EXAMPLE 2

To 100 gallons of a light paraffinic neutral oil containing 40 percent by weight of paraffin wax, heated to a temperature of 110° F. to 120° F., was added with stirring 200 pounds of crushed urea. While the slurry was being stirred 5 gallons of methyl alcohol was added. The mixture was stirred while being maintained at a temperature between 110° F. and 120° F. for about 3 hours after which time the reaction had been completed and no unreacted urea remained. The slurry was then centrifuged to separate the urea adduct cake. The cake was then ground to a particle size between about 20 and 100 mesh.

The urea adduct was found to have a urea content of 68 percent and a melting point of 278° F.

Storage stability tests run for 30 days at room temperature and 4 hours at 200° F. resulted in no deterioration or caking.

EXAMPLE 3

This example was run to illustrate the effects of varying the type of urea on the urea-adduct product. A light neutral paraffinic oil containing about 40 percent by weight of n-paraffin hydrocarbons having between 17 and 25 carbon atoms with the major fraction, about 90 percent, in the $C_{18}$ to $C_{23}$ range, said solution having a melting point of 93° F., was used in preparing the adducts of this example.

(A) 875 grams of technical grade crystalline urea were added with stirring to 2500 grams of the neutral oil solution heated to 120° F. To this heated mixture 180 ml. of methyl alcohol were added and stirring of the reaction mixture was continued for one hour while maintaining the temperature between 115° F. and 120° F. until the adduction was completed. The slurry was then filtered through a warm Büchner funnel under vacuum and the resulting filter cake was removed for analysis.

(B) 875 grams of prilled urea were added with stirring to 2500 grams of the neutral oil solution heated to 120° F., then 180 ml. of methyl alcohol were added to the heated mixture and stirring was continued while maintaining the temperature between 115° F. and 120° F. for about 4 hours until adduction was completed. The slurry was filtered as in (A) above and the filter cake was removed for analysis.

(C) 875 grams of ground prilled urea was reacted with 2500 grams of the neutral oil solution using the same procedure as in (A) above. The filter cake obtained was analyzed.

(D) To 4600 pounds (680 gals.) of neutral oil solution heated to 120° F. were added with stirring 1600 pounds of crystalline urea. To this stirred mixture, 40 gallons of methyl alcohol were added. The reaction mixture was stirred while being maintained at a temperature between 115° F. and 120° F. for 4 hours until adduction was completed. The reaction slurry was centrifuged and the adduct cake was removed and analyzed.

Table I summarizes the results of the analyses of compositions A to D above.

TABLE I

| | A | B | C | D |
|---|---|---|---|---|
| Total n-paraffin hydrocarbon percent | 44.0 | 42.0 | 44.0 | 33.5 |
| Adducted n-paraffin hydrocarbon | 19.1 | 18.8 | 19.0 | 22.0 |
| Urea | 56.0 | 58.0 | 56.0 | 66.5 |

It is apparent from the above table that a substantial portion of the n-paraffin content of the urea adduct of the present invention has not reacted with the urea in the manner taught by Brooks et al., supra. The weight ratio of urea to adducted n-paraffin for composition A was 2.9 gms. urea/gm. paraffin, composition B was 3.0 gms. urea/gm. paraffin, composition C was 2.9 gms, urea/gm. paraffin and composition D 3.0 gms. urea/gm. paraffin all of which compare favorably with the weight ratios reported in Brooks et al., supra as representative of the composition of crystalline urea adducts of normal hydrocarbons.

The weight ratio of urea to total n-paraffin found for the compositions of this example varies from about 1.3 for compositions A and C to 2.0 for composition D pointing out the substantial portion of n-paraffins that have not reacted with urea yet remain a stable part of the product. The remaining urea filter cakes of compositions A to D were ground to pass through a 20 mesh screen and samples of each were stored in closed containers. After one month storage, all samples were found to be dry and noncaked.

The surprising and unexpected advantages realized through use of the urea adducts of the present invention as a compounding ingredient for sponge rubber formulations is illustrated in the following two examples where both sulfur and non-sulfur vulcanized stocks are evaluated.

EXAMPLE 4

An ethylene propylene terpolymer rubber stock purchased under the trade name EPT3509 was used in preparing the compounds of this example.

| Compound | Parts by weight | | | | | |
|---|---|---|---|---|---|---|
| | A | B | C | D | E | F |
| EPT terpolymer | 100.0 | 100.0 | 100.0 | 100.0 | 100.0 | 100.0 |
| Medium thermal black | 80.0 | 80.0 | 80.0 | 80.0 | 80.0 | 80.0 |
| Petroleum oil plasticizer | 90.0 | 90.0 | 90.0 | 90.0 | 90.0 | 90.0 |
| Stearic acid | 1.0 | 1.0 | 1.0 | 1.0 | 1.0 | 1.0 |
| 40% dinitroso penta methylene tetramine, Unicel ND | 16.0 | 16.0 | 16.0 | 16.0 | 16.0 | 16.0 |
| Zinc oxide | 5.0 | 5.0 | 5.0 | 5.0 | 5.0 | 5.0 |
| Sulfur | 1.5 | 1.5 | 1.5 | 1.5 | 1.5 | 1.5 |
| Tetramethylthiuram disulfide | 2.0 | 2.0 | 2.0 | 2.0 | 2.0 | 2.0 |
| Selenium diethyl dithiocarbamate | 0.5 | 0.5 | 0.5 | 0.5 | 0.5 | 0.5 |
| Urea adduct | 0.3 | 3.0 | 5.0 | | | |
| Urea | | | | 0.3 | 3.0 | 5.0 |

The urea adduct of Example 1 was used in the preparation of compounds A, B and C. A finely ground commercial grade of urea was used in preparing compounds D, E, and F.

A 4″ x 4″ sample cut from the sheet prepared from each of the above compounds was placed in a 4″ x 4″ frame mold and then heated under pressure in a molding press at 308° F. for 12 minutes. The rubber samples were then placed in a 6″ x 6″ frame mold and heated under pressure in a molding press for 18 minutes at 308° F.

The urea adduct of the present invention was readily incorporated and dispersed in the rubber stocks during compounding. Cured samples prepared from compositions B and C completely filled the frame molds and had an excellent pore structure and surface texture. The blowing agent in composition A however was not activated by the amount of urea adduct employed in preparing this composition.

The urea, however, was very difficult to incorporate and disperse in the compounds and yielded a completely unsatisfactory product. Cured samples prepared from compounds D, E and F had a very coarse pore structure with rough skin full of pits and large blisters.

EXAMPLE 5

A chloroprene rubber stock purchased under the trade name Neoprene GNA was used in preparing the compounds of this example.

| Compound | Parts by weight | | | | | |
|---|---|---|---|---|---|---|
| | A | B | C | D | E | F |
| Neoprene GNA | 100.0 | 100.0 | 100.0 | 100.0 | 100.0 | 100.0 |
| Magnesium oxide, Maylite D | 4.0 | 4.0 | 4.0 | 4.0 | 4.0 | 4.0 |
| MT black | 32.0 | 32.0 | 32.0 | 32.0 | 32.0 | 32.0 |
| Petroleum oil plasticizer | 22.0 | 22.0 | 22.0 | 22.0 | 22.0 | 22.0 |
| Petrolatum | 3.0 | 3.0 | 3.0 | 3.0 | 3.0 | 3.0 |
| 40% dinitroso penta methylene tetramine, Unicel ND | 14.0 | 14.0 | 14.0 | 14.0 | 14.0 | 14.0 |
| Zinc oxide | 5.0 | 5.0 | 5.0 | 5.0 | 5.0 | 5.0 |
| Urea adduct | 0.3 | 3.0 | 5.0 | | | |
| Urea | | | | 0.3 | 3.0 | 5.0 |

The urea adduct of Example 2 was used in preparing compounds A, B and C. A finely ground commercial grade of urea was used in preparing compounds D, E and F.

A 4" x 4" sample cut from the sheet prepared from each of the above compounds was placed in a 4" x 4" frame mold and then heated under pressure in a molding press at 308° F. for 8 minutes. The rubber samples were then placed in 6" x 6" frame molds and heated in a molding press for 15 minutes at 308° F.

The urea adduct of the present invention was readily incorporated and dispersed in the rubber compositions. Cured samples prepared from compounds A, B and C had an excellent pore structure with no evidence of wild cells and a smooth skin with no signs of blisters, pits or voids evident.

The urea was very difficult to incorporate and disperse in the rubber compounds and yielded a completely unsatisfactory product. Cured samples prepared from compounds D, E and F had very coarse pore structure with many wild cells and a rough skin full of pits and large blisters.

EXAMPLE 6

To 90 parts of urea dissolved in 500 parts of methyl alcohol were added with stirring 20 parts of a paraffin wax having between 18 to 23 carbon atoms. After the wax was completely incorporated the mixture was stirred for about 2 hours and the precipitate was filtered off and dried. The urea content of the precipitate was found to be 77 percent and the paraffin wax content 23 percent, a urea to wax ratio of 3.4:1. All the wax had been adducted in the stochiometric proportions taught by Brooks et al., supra. The precipitate was ground to a particle size between about 20 and 100 mesh and a sample of the ground adduct was stored in a closed container for one month after which time it was found that very hard crystals had formed.

in a closed container for one month. Samples were cured using the procedure of Example 4.

The following observations were made:

Compound—
A, fresh ............ Blowing agent not activated.
A, aged ............ Do.
B, fresh ............ Sponge exhibits fairly good pore structure but wild cells noted. Surface had some imperfections.
B, aged ............ Sponge had very poor cell structure and surface. The adduct was difficult to incorporate and disperse when compounding.
C, fresh ............ Same results noted as with Compound B.
C, aged ............ Do.
D, fresh ............ Blowing agent not activated.
D, aged ............ Do.
E, fresh and aged ... Excellent sponge formed exhibiting uniform pore structure and surface texture.
F, fresh and aged ... Do.

The above illustrates the superiority of the urea adducts of the present invention as a compounding ingredient for sponge rubber vulcanizates in comparison to urea n-paraffin hydrocarbon adducts prepared in stoichiometric proportions.

Examples 7, 8 and 9 illustrate the vulcanization activation properties of the urea adducts of the present invention where both sulfur and non-sulfur vulcanized stocks are evaluated.

EXAMPLE 7

| Compound | Parts by weight | | | | | | | | |
|---|---|---|---|---|---|---|---|---|---|
| | A | B | C | D | E | F | G | H | I |
| Neoprene GNA | 100.0 | 100.0 | 100.0 | 100.0 | 100.0 | 100.0 | 100.0 | 100.0 | 100.0 |
| Magnesium oxide | 4.0 | 4.0 | 4.0 | 4.0 | 4.0 | 4.0 | 4.0 | 4.0 | 4.0 |
| High abrasion furnace black | 50.0 | 50.0 | 50.0 | 50.0 | 50.0 | 50.0 | 50.0 | 50.0 | 50.0 |
| Light process oil | 15.0 | 15.0 | 15.0 | 15.0 | 15.0 | 15.0 | 15.0 | 15.0 | 15.0 |
| Phenyl-beta-naphthylamine | 1.0 | 1.0 | 1.0 | 1.0 | 1.0 | 1.0 | 1.0 | 1.0 | 1.0 |
| Zinc oxide | 5.0 | 5.0 | 5.0 | 5.0 | 5.0 | 5.0 | 5.0 | 5.0 | 5.0 |
| Urea | | 0.3 | 3.0 | 5.0 | 10.0 | | | | |
| Urea adduct of Example 1 | | | | | | 0.3 | 3.0 | 5.0 | 10.0 |

The ethylene propylene terpolymer dry rubber polymer of Example 4 was used in preparing the compounds of this example.

Samples from each of the above compounds were cured in a molding press for 20 minutes at 308° F. The properties of the respective compounds are summarized below:

| | | | | | | | | | |
|---|---|---|---|---|---|---|---|---|---|
| Hardness Shore 'A' | 78 | 75 | 75 | 75 | 75 | 75 | 75 | 75 | 75 |
| Tensile, (p.s.i.) | 3,075 | 2,770 | 2,465 | 2,225 | 1,980 | 3,170 | 3,100 | 2,850 | 2,790 |
| ASTM elongation, percent | 360 | 300 | 265 | 270 | 250 | 370 | 360 | 340 | 355 |
| ASTM modulus: | | | | | | | | | |
| @300% E | 1,190 | | | | | | | | |
| @200% | | 1,600 | 1,685 | 1,510 | 1,395 | 1,500 | 1,450 | 1,330 | 1,015 |

| Compound | Parts by weight | | | | | |
|---|---|---|---|---|---|---|
| | A | B | C | D | E | F |
| EPT terpolymer | 100.0 | 100.0 | 100.0 | 100.0 | 100.0 | 100.0 |
| Medium thermal black | 80.0 | 80.0 | 80.0 | 80.0 | 80.0 | 80.0 |
| Petroleum oil plasticizer | 90.0 | 90.0 | 90.0 | 90.0 | 90.0 | 90.0 |
| Stearic acid | 1.0 | 1.0 | 1.0 | 1.0 | 1.0 | 1.0 |
| 40% dinotroso penta methylene tetramine | 16.0 | 16.0 | 16.0 | 16.0 | 16.0 | 16.0 |
| Zinc oxide | 5.0 | 5.0 | 5.0 | 5.0 | 5.0 | 5.0 |
| Tetramethyl thiuram disulfide | 2.0 | 2.0 | 2.0 | 2.0 | 2.0 | 2.0 |
| Selenium diethyl dithio carbamate | 0.5 | 0.5 | 0.5 | 0.5 | 0.5 | 0.5 |
| Urea adduct | 0.3 | 3.0 | 5.0 | 0.3 | 3.0 | 5.0 |

The urea adduct used in preparing compositions A, B and C above was the urea adduct of this Example 6. The urea adduct used in preparing compositions D, E and F above was the urea adduct of Example 2. Two sets of compositions were prepared, one set with freshly ground adduct, the other set with adduct that had been stored The difficulty in incorporating and dispersing the urea in the rubber stocks resulted in reduced properties whereas the activation of vulcanization for compounds containing the urea adduct of the present invention is evident from the good physical properties and high modulus obtained.

EXAMPLE 8

| Compound | Parts by weight | |
|---|---|---|
| | A | B |
| SBR 1500 | 100.0 | 100.0 |
| Stearic acid | 1.0 | 1.0 |
| High abrasion furnace black | 50.0 | 50.0 |
| Light process oil | 15.0 | 15.0 |
| Phenyl-beta-naphthylamine | 1.0 | 1.0 |
| Zinc oxide | 5.0 | 5.0 |
| Sulfur | 1.5 | 1.5 |
| Benzothiazyldisulfide | 1.0 | 1.0 |
| 2-mercaptobenzothiazole | 0.5 | 0.5 |
| Urea adduct of Example 2 | | 0.3 |

The dry rubber polymer used in preparing the compositions of this example was a cold non-pigmented butadiene-styrene polymer. Samples of both compositions were cured 20 minutes at 308° F. The properties obtained are summarized below:

| Compound | Parts by weight | |
|---|---|---|
| | A | B |
| Hardness Shore 'A' | 53 | 59 |
| Tensile, p.s.i. ASTM D412-64T | 1,250 | 2,660 |
| Elongation, percent ASTM D412-64T | 835 | 560 |
| Modulus at 300% E, p.s.i. ASTM D412-64T | 305 | 835 |

EXAMPLE 9

| Compound | Parts by weight | |
|---|---|---|
| | A | B |
| No. 1 smoked sheet | 100.0 | 100.0 |
| Stearic acid | 1.5 | 1.5 |
| High abrasion furnace black | 50.0 | 50.0 |
| Light process oil | 15.0 | 15.0 |
| Phenyl-beta-naphthylamine | 1.0 | 1.0 |
| Zinc oxide | 5.0 | 5.0 |
| Sulfur | 1.5 | 1.5 |
| Benzothiazyldisulfide | 1.0 | 1.0 |
| 2-mercaptobenzothiazole | 0.5 | 0.5 |
| Cadmium diethyldithiocarbamate | 0.3 | 0.3 |
| Urea adduct of Example 1 | | 0.3 |

Samples of both compositions were cured 10 minutes at 308° F. The properties obtained are summarized below:

| Compound | Parts by weight | |
|---|---|---|
| | A | B |
| Hardness Shore 'A' | 60 | 62 |
| Tensile, p.s.i. ASTM D412-64T | 3,145 | 3,280 |
| Elongation, percent ASTM D412-64T | 485 | 500 |
| Modulus at 300% E, p.s.i. ASTM D412-64T | 1,300 | 1,555 |

To produce sponge rubber vulcanizates, the urea adduct produced as described herein may be employed in amounts indicated above. Amounts as low as 0.1 weight part of the urea adducts of the present invention based on 100 weight parts of rubber exhibit some activity with regard to promoting controlled decomposition of the sponge rubber blowing agent and activating vulcanization. Higher amounts than those specifically shown as, for example, 10 weight parts per 100 weight parts of rubber, may be employed depending upon the compounding conditions and the objective of the compounder.

The invention in its broader aspects is not limited to the specific steps, methods, compositions and improvements shown and described herein, since various changes may be made without departing from the guiding principles and teachings of the invention disclosed above and without sacrificing its chief advantages.

What is claimed is:

1. In the vulcanization of sponge rubber, the improved method of vulcanization which comprises adding to a vulcanizable rubber compound and effecting the sponging of such compound with a blowing agent in the presence of a small amount of an adduction product of urea with a stoichiometric excess of at least 5% of a solution containing between about 25 to 75 weight percent of n-paraffin hydrocarbon having about 17 to 30 carbon atoms in light neutral paraffinic oil.

2. An unvulcanized rubber composition comprising vulcanizable rubber, a vulcanizing agent, a small amount of an adduction product of urea with a stoichiometric excess of at least 5% of a solution containing between about 25 to 75 weight percent of a n-paraffin hydrocarbon having about 17 to 30 carbon atoms in light neutral paraffinic oil, and a blowing agent.

References Cited

UNITED STATES PATENTS 3,502,632  3/1970  Ross et al. _____ 260—2.5

MURRAY TILLMAN, Primary Examiner

M. FOELAK, Assistant Examiner

U.S. Cl. X.R.

260—33.6, 41.5, 96.5, 722